United States Patent
Schwartz

(10) Patent No.: US 7,351,932 B2
(45) Date of Patent: Apr. 1, 2008

(54) METHOD AND APPARATUS FOR WELDING WITH VOLTAGE CONTROL

(75) Inventor: Brian A. Schwartz, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 558 days.

(21) Appl. No.: 10/993,112

(22) Filed: Nov. 19, 2004

(65) Prior Publication Data

US 2006/0108343 A1    May 25, 2006

(51) Int. Cl.
B23K 9/095    (2006.01)
(52) U.S. Cl. ................................. 219/130.33
(58) Field of Classification Search ........... 219/130.21, 219/130.31, 130.32, 130.33
See application file for complete search history.

(56) References Cited

U.S. PATENT DOCUMENTS

| | | | |
|---|---|---|---|
| 4,247,752 A | * | 1/1981 | Stringer ................. 219/130.33 |
| 4,665,299 A | * | 5/1987 | Iwata et al. ............ 219/130.21 |
| 5,783,799 A | | 7/1998 | Geissler |
| 6,815,639 B2 | | 11/2004 | Geissler |

FOREIGN PATENT DOCUMENTS

| | | | |
|---|---|---|---|
| JP | 55-122679 A | * | 9/1980 |
| JP | 55-147477 A | * | 11/1980 |

OTHER PUBLICATIONS

Miller® The Power of Blue Invision 456P And Phoenix 456 CC/CV (230/460 And 575 Volt Models) Owner's Manual Feb. 2001.
Miller® The Power of Blue Deltaweld Series Technical Manual Jul. 2000.

* cited by examiner

*Primary Examiner*—Clifford C. Shaw
(74) *Attorney, Agent, or Firm*—George R. Corrigan

(57) ABSTRACT

A method and apparatus for providing welding-type power includes an input circuit, a switched circuit connected to the input circuit, and an output circuit connected to the switched circuit. A controller controls the system output in response to a setpoint and an output feedback signal. A first gain is used to control the output at start up, and a second gain is used to control the output during steady-state welding. The first gain is greater than the second gain.

47 Claims, 2 Drawing Sheets

METHOD AND APPARATUS FOR WELDING WITH VOLTAGE CONTROL

FIELD OF THE INVENTION

The present invention relates generally to the art of welding-type power supplies. More specifically, it relates to welding-type power supplies that have a controllable output.

BACKGROUND OF THE INVENTION

There are many known welding-type power supplies having many known designs. (Welding-type power supply, as used herein, includes power supplies used for welding heating, cutting, and other similar high current applications.) Welding-type power supplies are designed to provide various features, such as a response fast enough to respond to changes in the arc, a response not so fast as to make the arc unstable, a desirable starting current and/or voltage, a controllable output, adapting to various inputs, cost, efficiency etc.

Known designs address these concerns to varying extent. For example, the Miller Delta Weld® provides an output that almost immediately is at the set point. This is useful for easy and sustainable starts, however the topology used does not easily receive different inputs and provide different types of outputs. Conversely, the Miller XMT® provides a very controllable output with a stable arc after, but when the arc is struck it takes time for the output to rise to the setpoint. Prior art machines typically make such design consideration trade-offs, particularly at high currents.

Accordingly, a welding-type power supply that quickly provides the desired output current at start up, yet provides a stable arc, is desired. Preferably, the welding-type power supply will provide a variety of types of outputs.

SUMMARY OF THE PRESENT INVENTION

According to a first aspect of the invention a method and apparatus for controlling a welding-type power supply include controlling the output in response to a setpoint and an output feedback signal. A first gain is used to control the output at start up, and a second gain is used to control the output during steady-state welding. The first gain is greater than the second gain.

According to a second aspect of the invention a welding-type power supply includes an input circuit, a switched circuit connected to the input circuit, and an output circuit connected to the switched circuit. A controller controls the system output in response to a setpoint and an output feedback signal. A first gain is used to control the output at start up, and a second gain is used to control the output during steady-state welding. The first gain is greater than the second gain.

The second gain is used a predetermined time after the start of the welding process, such as 165 milliseconds in various embodiments. Alternatively, the second gain is used after a difference between the setpoint and the feedback signal is less than a threshold. These may be used in an "AND" combination, an "OR" combination, or individually.

The start of the welding process may be determined by a user pulling a trigger, an output current flowing, or in response to an output voltage in various embodiments.

The control may be a PI or PID controller in various embodiments

The control includes an inner current control loop and an outer voltage control loop in other embodiments The feedback signal is responsive to output voltage in another embodiment.

Other principal features and advantages of the invention will become apparent to those skilled in the art upon review of the following drawings, the detailed description and the appended claims.

Figure 1:
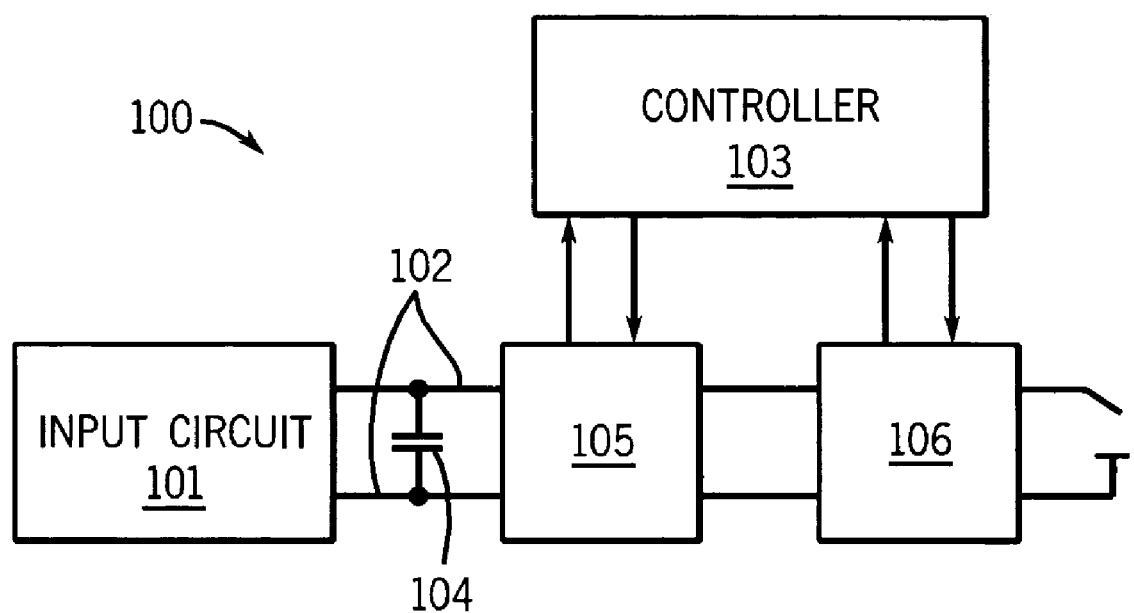
FIG. 1 is a block diagram of a welding-type power supply in accordance with the preferred embodiment.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to it should be understood at the outset that the welding-type power supply and controller are shown using a particular topology, design and components, but can also be implemented with other topologies, designs and components, and used for other processes.

Generally, the invention provides for a desirable start of the welding process and desirable steady-state welding. The preferred embodiment provides a greater control gain at start-up, and then a lesser gain during steady-state welding. Thus, at start-up the high gain causes the welding-type power supply to respond very quickly and very quickly increase the output voltage. After steady-state welding has been reached the lesser gain is used, which provides for more stable welding. Gain, as used herein, refers to the gain of the control scheme, which affects the speed with which the power circuit changes its output in response to a changed command or an error. Responsive to, or in response to, as used herein, includes responding to changes in a value of a parameter or a function of that parameter, such as changing the value of a control signal or other parameter, opening or closing a switch, etc.

The change from the greater to lesser gain is, in the preferred embodiment, based on two conditions being met: a time delay from the start of the welding process, and the error or difference between the setpoint and the actual voltage being less than a threshold (which may be fixed, varying or user set). Various embodiments provide for using one of these conditions being met, either condition being met, or other conditions being met, such as in response to a function of the error.

Start-up, or the start of the welding process may be determined by the user pulling the trigger on the welding gun, output current flowing, output voltage (the voltage at the studs and/or the arc, e.g.) indicating an arc has been struck, or other methods. Steady state welding, as used herein, refers to welding that occurs after start-up.

A welding-type power supply 100, as shown in FIG. 1, includes in accordance with the preferred embodiment, an input circuit 101, a bus 102, controller 103, capacitors 104, a switched circuit 105, and an output circuit 106. Input circuit 101 includes a rectifier in the preferred embodiment. Switched circuit 105 switches the power from the bus, and is preferably a converter, such as an inverter, boost, buck, resonant, cuk, etc. Output circuit preferably includes a rectifier and a smoothing inductor. One preferred topology is that of a Miller XMT® welding power supply. Alternative preferred embodiments includes that shown in U.S. Pat. No. 5,783,799, issued to Geissler, Jul. 21, 1998 and U.S. Pat. No. 6,815,639, issued to Geissler, Nov. 9, 2004, both of which are hereby incorporated by reference. Other topologies may also be used to implement the invention. For example, a chopper may implement switched circuit 105, with a smoothing inductor as part of output circuit 106 (with a chopper, an output rectifier is not needed.

Input circuit, as used herein, includes the components that receive input power and/or change the input power for use by subsequent stages or circuits. Switched circuit, as used herein, includes at least one switch, and other components used to switch power, such as converters, inverters, etc. Output circuit, as used herein, includes components that receive power from a preceding stage or circuit and provide it to the output, it can, but need not, include switches, rectifiers, etc.

Controller 103 may be similar to prior art controllers, with the addition of the control function of providing greater gain at start-up. The preferred embodiment uses the controller of a Miller XMT®, and adds the higher gain at start up.

Generally, controller 103 provides for current control of the output by PWM. The current control acts in a conventional manner by setting a current command signal for a PWM circuit and using output current feedback. The current command is set by a current control loop and is responsive to a voltage control loop that compares output voltage to a voltage setpoint. The user sets the voltage set point, thus the system may be described as voltage controlled. The current control loop is called an inner loop, and the voltage control loop is called the outer loop, because the voltage error determines the current command.

The controller and/or control loops described above are implemented, in various embodiments, with a PI control module, a PID control module, and/or current feedback used in the voltage loop for droop. Other schemes may be used to implement the invention. Controller, as used herein, includes digital and analog circuitry, discrete or integrated circuitry, microprocessors, DSPs, etc., and software, hardware and firmware, located on one or more boards, used to control a device such as a power supply or power source. Module, as used herein, includes software and/or hardware that cooperates to perform one or more tasks, and can include digital commands, control circuitry, power circuitry, networking hardware, etc. A control module is a module that implements at least a part of a controller. A PI or PID controller or control module is a controller or module implementing at least a PI or PID, respectively, control scheme.

Figure 2:
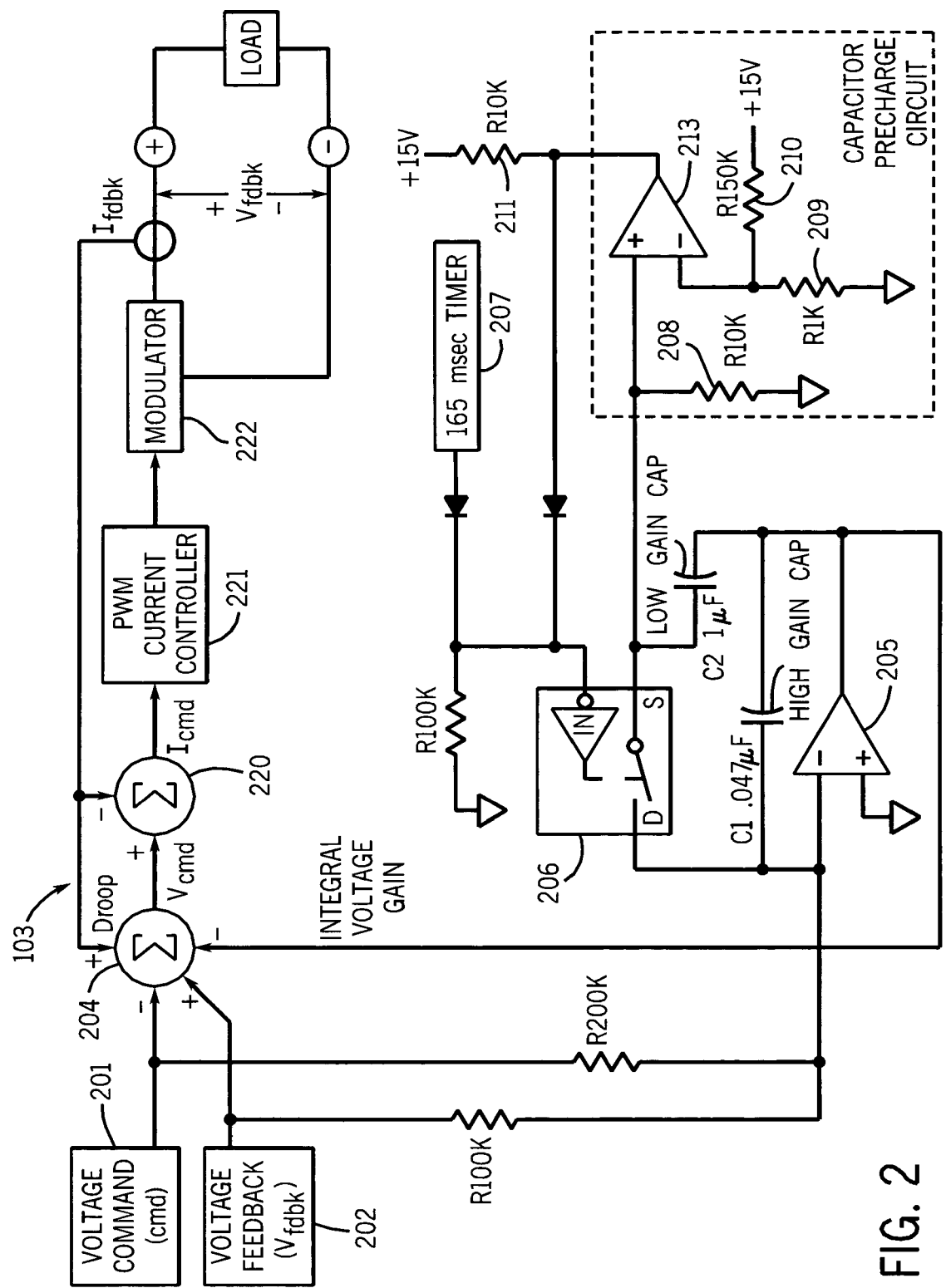
FIG. 2 is a diagram of a portion of a controller in accordance with the preferred embodiment.

Controller 103 is implemented with the known Miller XMT® controller, but modified as shown in FIG. 2. A voltage command signal 201, a voltage feedback signal 202, a droop signal (current feedback), and a integral voltage gain signal are summed at 204. The integral voltage gain is provided by an op amp 205. Op amp 205 has two capacitors in its feedback loop, capacitor C1 (0.0417 microfarads), and C2 (1.0 micro farads). C1 is always in the feedback loop, and C2 is switched into the feedback loop to change the gain from greater to lesser. At start up, C2 is not in the loop, and the gain is dictated by C1. When C2 is switched into the loop, C1 and C2 are in parallel, and the gain is effectively provided by C2 (because it has a much greater capacitance).

C2 is switched into the loop by switch 206, which is controlled by a 165 msec timer 207 in an "AND" configuration with voltage error components. The voltage error components include resistors 208-211 and an op amp 213. Controller 103 also provides for the inner current loop with summer 220, pwm controller 221, modulator 222, as in the prior art. Other embodiments provide for a digital controller, such as a DSP or microprocessor, and/or only current control, and or no inner current controller.

Numerous modifications may be made to the present invention which still fall within the intended scope hereof. Thus, it should be apparent that there has been provided in accordance with the present invention a method and apparatus for welding that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method of controlling a welding-type power supply, comprising:
   controlling the output in response to a setpoint and an output feedback signal;
   using a first gain to control the output at start up; and
   using a second gain to control the output during steady-state welding, wherein the first gain has a first magnitude and the second gain has a second magnitude, and the first magnitude is greater than the second magnitude.

2. The method of claim 1, wherein the second gain is used a predetermined time after the start of the welding process.

3. The method of claim 2, wherein the predetermined time is 165 milliseconds.

4. The method of claim 1, wherein the start of the welding process is determined by a user pulling a trigger.

5. The method of claim 1, wherein the start of the welding process is determined by an output current flowing.

6. The method of claim 1, wherein the start of the welding process is determined in response to an output voltage.

7. The method of claim 1, wherein the second gain is used after a difference between the setpoint and the feedback signal is less than a threshold.

8. The method of claim 1, wherein the second gain is used after the later of a predetermined time after the start of the welding process and a difference between the setpoint and the feedback signal being less than a threshold.

9. The method of claim 1, wherein the second gain is used after the earlier of a predetermined time after the start of the welding process and a difference between the setpoint and the feedback signal being less than a threshold.

10. The method of claim 1, wherein the control is a PI control.

11. The method of claim 1, wherein the control is a PID control.

12. The method of claim 1, wherein the control includes an inner current control loop and an outer voltage control loop.

13. The method of claim 1, wherein the feedback signal is responsive to output voltage.

14. A welding-type power supply controller, comprising:
   means for controlling the output in response to a setpoint and an output feedback signal;

means for providing a first gain to control the output at start up; and means for providing a second gain to control the output during steady-state welding, wherein the first gain has a first magnitude and the second gain has a second magnitude, and the first magnitude is greater than the second magnitude.

15. The welding-type power supply controller of claim 14, further comprising means for changing from the first gain to the second gain a predetermined time after the start of the welding process.

16. The welding-type power supply controller of claim 15, wherein the predetermined time is 165 milliseconds.

17. The welding-type power supply controller of claim 15, wherein the means for changing is responsive to an output current flowing.

18. The welding-type power supply controller of claim 15, wherein the means for changing is responsive to an output voltage.

19. The welding-type power supply controller of claim 15, wherein the means for controlling includes a PI control module.

20. The welding-type power supply controller of claim 15, wherein the means for controlling includes a PID control module.

21. The welding-type power supply controller of claim 15, wherein the means for controlling includes an inner current control loop and an outer voltage control loop.

22. The welding-type power supply controller of claim 15, wherein the output feedback signal is responsive to output voltage.

23. The welding-type power supply controller of claim 14, wherein the means for changing is responsive to a user pulling a trigger.

24. The welding-type power supply controller of claim 14, further comprising means for changing from the first gain to the second gain in response to a difference between the setpoint and the feedback signal.

25. The welding-type power supply controller of claim 14, further comprising means for changing from the first gain to the second gain in response to the later of a predetermined time after the start of the welding process and a difference between the setpoint and the feedback signal being less than a threshold.

26. The welding-type power supply of controller claim 14, further comprising means for changing from the first gain to the second gain in response to the earlier of a predetermined time after the start of the welding process and a difference between the setpoint and the feedback signal being less than a threshold.

27. A welding-type power supply controller, comprising a control module having a setpoint input and a feedback input, and a control output, wherein the control module includes a first gain module, a second gain module, and a gain select module, wherein the gain select module selects the first gain modules at start up and selects the second gain module to control the output during steady-state welding, wherein the first gain module has a first gain magnitude and the second gain module has a second gain magnitude, and the first magnitude is greater than the second magnitude.

28. The welding-type power supply controller of claim 27, wherein the gain select module is responsive to a predetermined time after the start of the welding process.

29. The welding-type power supply controller of claim 28, wherein the predetermined time is 165 milliseconds after the start of the welding process.

30. The welding-type power supply controller of claim 28, wherein the start of the welding process is determined by a user pulling a trigger.

31. The welding-type power supply controller of claim 28, wherein the start of the welding process is determined by output current flowing.

32. The welding-type power supply controller of claim 27, wherein the gain select module is responsive to a difference between the setpoint and the feedback signal being less than a threshold.

33. The welding-type power supply controller of claim 27, wherein the control module is a PI control module.

34. The welding-type power supply controller of claim 27, wherein the control module is a PID control module.

35. The welding-type power supply controller of claim 27, wherein the control module includes an inner current control loop module and an outer voltage control loop module.

36. A welding-type power supply, comprising:
an input circuit;
a switched circuit connected to the input circuit;
an output circuit connected to the switched circuit; and
control means for controlling the switched circuit, including means for controlling the output in response to a setpoint and an output feedback signal, means for providing a first gain to control the output at start up, and means for providing a second gain to control the output during steady-state welding, wherein the first gain has a first magnitude and the second gain has a second magnitude, and the first magnitude is greater than the second magnitude.

37. The welding-type power supply of claim 36, further comprising means for changing from the first gain to the second gain a predetermined time after the start of the welding process.

38. The welding-type power supply of claim 36, further comprising means for changing from the first gain to the second gain in response to a difference between the setpoint and the feedback signal.

39. The welding-type power supply of claim 38, wherein the means for controlling includes means for PI controlling.

40. The welding-type power supply of claim 38, wherein the means for controlling includes means for PID controlling.

41. The welding-type power supply of claim 38, wherein the means for controlling includes an inner current control loop and an outer voltage control loop.

42. A welding-type power supply, comprising:
an input circuit;
a switched circuit connected to the input circuit;
an output circuit connected to the switched circuit; and
a controller, comprising a control module having a setpoint input and a feedback input, and a control output, wherein the control module includes a first gain module, a second gain module, and a gain select module, wherein the gain select module selects the first gain modules at start up and selects the second gain module to control the output during steady-state welding, wherein the first gain module has a first gain magnitude and the second gain module has a second gain magnitude, and the first magnitude is greater than the second magnitude.

43. The welding-type power supply of claim 42, wherein the gain select module is responsive to a predetermined time after the start of the welding process.

44. The welding-type power supply of claim 43, wherein the control module is a PI control module.

45. The welding-type power supply of claim 42, wherein the gain select module is responsive to a difference between the setpoint and the feedback signal being less than a threshold.

46. The welding-type power supply of claim 44, wherein the control module is a PID control module.

47. The welding-type power supply of claim 44, wherein the control module includes an inner current control loop module and an outer voltage control loop module.

* * * * *